United States Patent Office 3,445,366
Patented May 20, 1969

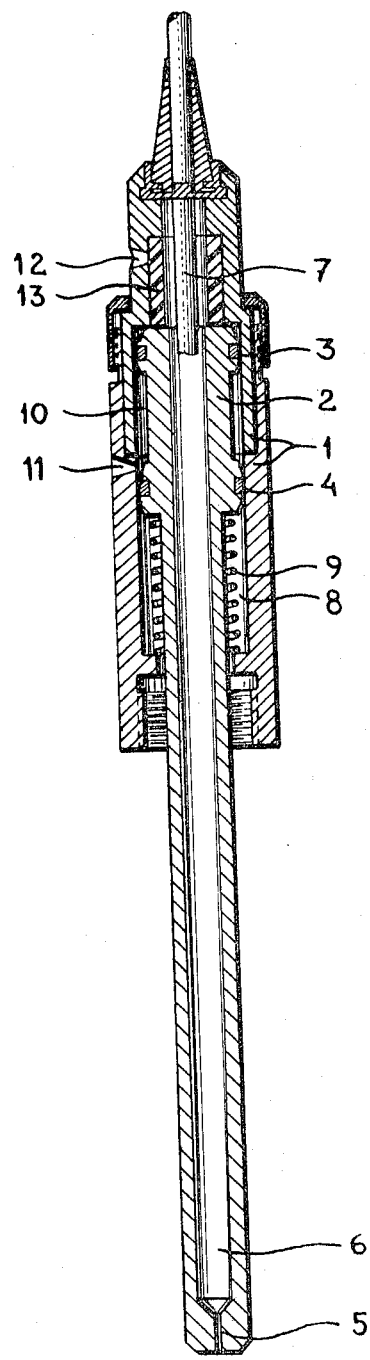

3,445,366
PRESSURIZED ELECTRODE
Willem Vermeer, Barneveld, Netherlands, assignor to Maatschappij voor Electrische Bedrijfsautomatisering Electrofact N.V., Amersfoort, Netherlands, a Dutch limited-liability company
Filed Aug. 25, 1965, Ser. No. 482,517
Claims priority, application Netherlands, Aug. 31, 1964, 6410141
Int. Cl. B01k *3/02, 3/00*
U.S. Cl. 204—195                    10 Claims

ABSTRACT OF THE DISCLOSURE

A probe for measuring pH-values in a fluid is composed of a housing forming a longitudinally extending chamber open at one end an exhaust tube disposed within the housing and slidably positionable through the chamber. The exhaust tube extends into the fluid being measured. The exhaust tube and the chamber within the housing are dimensioned to provide a difference in effective cross sectional areas acted upon by fluid being measured and the electrolyte fluid, to assure that the electrolyte fluid is pressurized to an extent greater than the fluid being measured.

---

The invention relates to a measuring probe for pH-measurements, comprising an electrolyte containing housing in which an electrode and an exhaust tube terminating in one or more narrow channels are arranged. In industrial use, such a probe is often provided in a vessel or conduit in which widely different pressures and temperatures can prevail.

Nevertheless, the electrolyte pressure must be maintained at least equal to the pressure in the vessel or the conduit, in order to ensure that the surrounding fluid cannot enter the probe.

A known embodiment of a reference probe which meets these requirements consists in providing the probe with a pressurized air connection, by means of which a fixed pressure, at least equal to the highest pressure which can occur in the vessel or the conduit, can be exerted on the electrolyte solution. It is a disadvantage of this design, that the pressure on the electrolyte is, on the average, considerably higher than the pressure of the surrounding fluid, which needlessly increases the electrolyte consumption.

It has also been proposed to keep the pressure in the reference probe at least equal to the pressure in the vessel or the conduit by means of a pressure controller which responds to the pressure in the vessel or the conduit, instead of using a constant air pressure on the electrolyte. However, this type of control is expensive and cumbersome and still necessitates the use of pressurized air.

According to another embodiment of a reference probe for measurements in vessels and conduits in which varying pressures and temperatures can occur, the probe is completely filled with electrolyte. Even upon the occurrence of pressure variations, it will thereby be prevented with certainty that the surrounding fluid enters the probe from the vessel or the conduit. Major temperature variations, however, will cause the electrolyte which during heating-up has passed from the probe due to its high coefficient of expansion, to be replaced by the surrounding fluid during cooling-off, which causes contaminaton and clogging of the probe.

The invention aims at providing a probe which entirely satisfies the requirements, which is of a simple construction and which is free from the disadvantages of the designs referred to hereinabove.

For that purpose, a probe according to the invention comprises an exhaust tube which is longitudinally slidable in a housing and which at one or more locations is sealed with respect to that housing.

This design functions as follows:

By the pressure of the electrolyte fluid within the housing of the probe, the exhaust tube will slide through the housing over such a distance, that the internal pressure equals the external pressure, while the surrounding fluid is prevented from entering the probe. If the temperature increases, the internal pressure has a tendency to increase due to the high coefficient of expansion of the fluid, but this tendency is prevented from attaining a practical realization, because the exhaust tube will then slide outwards through the housing. A temperature decrease will not be able to create a reduced pressure in the housing, because the exhaust tube will slide back into the housing.

The friction between the housing and the exhaust tube can be kept so low as compared to the flow resistance of the electrolyte in the contact channels, that no reduced pressure can occur in the probe due to friction, during the movements of the exhaust tube within the housing under the influence of pressure or temperature variations. Only under certain circumstances, such as during measurements in strongly contaminating fluids, the risk exists that the friction will become inadmissibly high.

In order to prevent this, the probe according to the invention can be provided with an element which at all times provides an increased pressure in the probe.

Such an element can, for example, consist of a simple spring which has the tendency of pushing the exhaust tube, inwardly into the housing. Moreover, the effect of the spring, especially if pressure variations are expected, can be enhanced by having the exhaust tube sealed with respect to the housing at two locations, with each location having different diameter and effective area. In such a case, the electrolyte pressure is effective on the inner seal, which has the smaller diameter, while the pressure of the fluid medium, into which the probe is inserted, is effective on the outer face of the outer seal, which has the larger diameter.

Because the medium pressure is operative on a larger surface area of the exhaust tube than the electrolyte pressure, the electrolyte pressure within the probe at all times exceeds the medium pressure. Thereby, the medium is prevented from entering into the probe and mixing with the electrolyte.

The invention is further elucidated below with reference to the drawing, which shows a longitudinal section through a probe embodying the invention.

In the housing 1 an exhaust tube 2 containing an electrolyte is provided slidably positionable in its longitudinal direction in the open space formed within the housing, the exhaust tube being sealed relative to the interior of the housing by means of two sealing rings 3 and 4 respectively, which preferably are O-rings, the sealing ring 4 having the larger diameter. An inwardly projecting rib on the inner surface of the housing preventing the exhaust tube from being displaced outwardly from the housing. At the lower end, a porous insert 5, such as an unglazed ceramic, is provided in the exhaust tube 2, the pores defining channels through which the electrolyte 6 can contact the surrounding fluid. At the upper end of the exhaust tube, an electrode 7 is provided extending into the electrolyte 6. Below the sealing ring 4 an annular open space 8 is provided between the inner surface of the housing and the outer surface of the exhaust tube 2. The lower end of the housing is open and has a threaded surface for engagement with a conduit or vessel holding the fluid into which the probe is inserted. The fluid to be measured enters the space 8 through the open lower end of the housing. An increase in pressure on the electrolyte within the probe is obtained by means of the spring 9. The pressure of the electrolyte 6 is operative on the upper face of the smaller sealing ring 3 and the pressure of the fluid surrounding the exhaust tube 2 is through the space 8 operative on the lower face of the larger sealing ring 4. In other words, the area within the housing contacted by the seal ring 3 and against which the electrolyte 6 is effective is less than the area contacted by the seal ring 4 and against which the fluid medium is effective so that the pressure in the electrolyte 6 at all times somewhat exceeds the pressure of the fluid. The annular space 10 within the housing 1 and encircling the exhaust tube 2 between the two sealing rings is connected through the aperture 11 with the atmosphere. An additionally increased pressure on the electrolyte can be obtained by evacuating and sealing the space 10. However, it is difficult to ensure that the vacuum in the space 10 is permanent. As usual, since the electrolyte supply seeps through the porous insert 5 it must be replenish from time to time. This can be done by means of a conventional syringe, the cone of which is inserted into the filling aperture 12 and injects the electrolyte into the exhaust tube 2. To ensure that no electrolyte escapes from the filling aperture 12, a sleeve 13 of flexible material is provided against the inner surface of the housing 1, the sleeve internally covering the filling aperture 12. In injecting the electrolyte the syringe passes through the sleeve 13. The exhaust tube 2 has been shown in the innermost position. As electrolyte 6 is injected into and fills the exhaust tube 2 it acts against the effective area at the enlarged upper end of the tube above the sealing ring 3 and forces the tube to slide in the downward direction, as viewed in FIG. 1, that is, toward the threaded end of the housing. As the tube 2 slides downwardly it compresses the spring 9 which in turn effects a pressurizing action on the electrolyte. When the housing is threaded into engagement with a conduit or vessel containing a fluid whose pH-value is to be measured by the probe, the fluid to be measured enters the space 8 and acts against the effective area of the enlarged end of the tube below the sealing ring 4. Since the effective area contacted by the fluid to be measured is larger than the effective area contacted by the electrolyte, the electrolyte will be pressurized to a degree at least slightly in excess of the pressure exerted by the fluid to be measured. The spring 9 will add to the pressure imparted to the electrolyte. However, with this arrangement, whether or not a spring is used, the electrolyte will always be pressurized to a degree slightly greater than the fluid being measured and there will be no possibility of the fluid being measured entering the exhaust tube and mixing with the electrolyte.

As the electrolyte gradually seeps through the porous insert 5 the exhaust tube 2 will slide upwardly within the housing 1 until it approaches or contacts the lower end of the sleeve 13, the position shown in FIG. 1, and then additional electrolyte can be injected into the tube through the aperture 12 and the sleeve 13 to continue the operations of the probe.

What I claim is:

1. A probe for measuring pH-values in a fluid comprising a housing forming a longitudinally extending laterally enclosed space closed at one end and opened at the other end, an exhaust tube disposed within the space in said housing and being longitudinally slidable therethrough, said exhaust tube open at one end within said housing and having its other end extending outwardly from said housing, means within the space in said housing to prevent said exhaust tube from being displaced from the space therein, seal means arranged between the outer surface of said exhaust tube and inner surface of said housing for preventing the leakage of fluid therebetween while maintaining said tube in sliding relationship with said housing, a porous insert disposed in and closing the other end of said exhaust tube for permitting electrolyte fluid within said exhaust tube to seep therethrough while maintaining the pressure of the electrolyte fluid within said exhaust tube, the space within said housing having a smaller cross sectional area in the portion thereof disposed between said sealing means and the closed end of the space as compared with a larger cross sectional area of the open space on the opposite side of said sealing means and communicating with the open end of said space, said housing having an inlet opening for charging electroltye fluid into said exhaust tube, and means in said housing for sealing the inlet opening for preventing leakage of electrolyte fluid therefrom, whereby as electrolyte fluid in an amount in excess of that required to fill said exhaust tube is charged into said exhaust tube the electrolyte fluid acting on said exhaust tube slides said exhaust tube within said housing away from the closed end of the space therein, and said housing adapted to be secured to a vessel containing fluid whose pH-value is to be measured with said exhaust tube extending into the fluid whereby the fluid to be measured enters the open end of the space in said housing and communicates with the larger cross sectional area in the space for pressurizing the electrolyte fluid within said exhaust tube.

2. A probe as set forth in claim 1, wherein the end of said exhaust tube within said housing for a portion of its extent within said housing has an increased wall thickness as compared to the remainder of said exhaust tube.

3. A probe as set forth in claim 2, wherein said seal means comprises a pair of space O-rings mounted on the exterior surface of said exhaust tube having the increased wall thickness and disposed in sealing and sliding engagement with the opposed inner surface of said housing.

4. A probe as set forth in claim 3, wherein one of said O-rings is disposed in contact with the inner surface of said housing having the smaller cross sectional area and the other said O-ring is in contact with the inner surface of said housing having the larger cross sectional area whereby the effective cross sectional area of said exhaust tube at the closed end of the space in said housing is less than the effective cross sectional area of said exhaust tube at the opposite end of the section thereof having the increased wall thickness.

5. A probe as set forth in claim 3, wherein the portion of said exhaust tube having the increased wall thickness located between said O-rings forming, in combination with the inner surface of said housing and said O-rings, an annular shaped chamber.

6. A probe as set forth in claim 5, wherein said housing has an opening therethrough communicating with the annular shaped chamber for admitting fluid thereto.

7. A probe as set forth in claim 1, wherein said means within said housing preventing said exhaust tube from being displaced outwardly from the space therein comprises an annular shaped rib projecting inwardly from the inner surface of said housing.

8. A probe as set forth in claim 7, wherein a spring is disposed about said exhaust tube outwardly from the section thereof having the increased wall thickness and extending between said rib on the interior surface of said housing and the section of said exhaust tube having the increased wall thickness.

9. A probe as set forth in claim 1, wherein said means for sealing said inlet opening in said housing communicating with said exhaust tube comprising a flexible sleeve fitted within and in sealing engagement with the inner surface of said housing at the location of the inlet opening therethrough.

10. A probe as set forth in claim 1, wherein the open end of the space in said housing being threaded and adapted to secure said housing to a vessel containing fluid the pH-value of which is to be measured.

References Cited

UNITED STATES PATENTS

| | | | |
|---|---|---|---|
| 2,846,386 | 8/1958 | Ingruber | 204—195 |
| 2,930,967 | 3/1960 | Laird et al. | 204—195 |
| 3,152,057 | 10/1964 | Conger et al. | 204—195 |
| 3,152,058 | 10/1964 | Hutchison et al. | 204—195 |
| 3,208,928 | 9/1965 | Landers et al. | 204—195 |

HOWARD S. WILLIAMS, *Primary Examiner.*

M. TUNG, *Assistant Examiner.*